United States Patent [19]

Wills

[11] 4,046,544
[45] Sept. 6, 1977

[54] ALKALINE GLASS MELTING WITH POROUS COVER

[76] Inventor: John Haines Wills, Box 37, Cheyney, Pa. 19319

[21] Appl. No.: 641,400

[22] Filed: Dec. 17, 1975

Related U.S. Application Data

[63] Continuation-in-part of Ser. No. 331,963, Feb. 12, 1973, abandoned.

[51] Int. Cl.² .......................... C03B 5/16; C03B 3/00; C03B 32/32
[52] U.S. Cl. ............................................. 65/27; 65/29; 65/134; 65/162; 65/335; 13/6; 423/332
[58] Field of Search .................... 65/27, 134, 335, 29, 65/162, DIG. 4, 136; 13/6; 423/332

[56] References Cited

U.S. PATENT DOCUMENTS

| 2,863,932 | 12/1958 | Gell et al. ............................ 65/335 X |
| 2,975,555 | 3/1961 | Zellers, Jr. et al. ..................... 65/27 |
| 2,993,079 | 7/1961 | Avgsburger ........................ 65/136 X |
| 3,192,302 | 6/1965 | Keefer .............................. 65/162 X |
| 3,630,267 | 12/1971 | Hlinka et al. ........................ 65/134 X |

Primary Examiner—S. Leon Bashore
Assistant Examiner—Frank W. Miga

[57] ABSTRACT

In the art of manufacturing alkaline glasses in electric resistance furnaces, improved results are obtained by use of a porous insulating blanket formed from granulated or aggregated raw batch and by conforming the interior of the furnace to the currents within the melt and permitting the formed gaseous components to escape the rough the porous insulating blanket.

3 Claims, 4 Drawing Figures

ALKALINE GLASS MELTING WITH POROUS COVER

This is a continuation-in-part of application S.N. 331963 filed on Feb. 12, 1973 now abandoned.

An electric furnace for forming soluble silicate (e.g. sodium and potassium silicates) glass melts is desirable wherever the rates charged for electric current are sufficiently low. Since the trend is toward increasing use of electricity, the development of improved furnaces and methodology likewise becomes of increased value. Furnaces employing electrical energy are desirable because the capital cost is comparatively low. The design is quite simple, usually being a simple rectangle. There is very little wasted heat and therefore outside structures such as checkers and flues are not needed. The furnace has a comparatively long life with a continuous flow of melt and requires a minimum of oversight. It readily lends itself to automatic controls and is the chosen means of melting glass wherever it can be shown to be economical. Any way of reducing the costs still further in order to overcome the relatively high cost of electricity in many areas is welcomed. It is well known that the overall economy of glass manufacture dictates that the furnaces be near areas where the product is to be used and therefore many furnaces are installed in areas where electricity is not the cheapest source of energy. The need for improved furnace design is important as it is clear that industry will turn to electrical energy in more and more areas in the foreseeable future.

The manufacture of soluble silicates is described in detail by Vail in "Soluble Silicates" Reinhold Publishing Co., 1952. The raw batch materials consist of fines and larger particles of silica sand, $SiO_2$, and an alkali metal salt decomposable by reaction with heat into the alkali metal oxide, $M_2O$, and a gas, usually $CO_2$, or a sulfur oxide e.g., $Na_2CO_3$ or $Na_2SO_4$. When a gas or oil fired regenerative furnace is used, these raw materials may be aggregrated and/or granulated with a dilute alkaline liquid before they are added to the melt. This is done in order to avoid the loss of the dust particles which get caught in the strong blast of hot gases and are carried out of the melting chamber. When electric resistance furnaces are used, there are no high velocity gases and the raw materials, usually sand and soda ash, are merely mixed together and placed over the melted silicate glass as an insulating cover or blanket. Now, however, I find that at ratios less than 2.8 $SiO_2Na_2O$ it is important and critical to first aggregate and/or granulate the raw batch materials with a liquid taken from the group consisting of water and dilute alkaline solutions to form particles having a mean diameter of about 0.04 cm such that when formed into a blanket over the silicate melt, the blanket is porous and provides escape passages for the gases which are inherently present in the batch and are given off during melting of the batch materials. The larger portion of these gases forms by the decomposition of the alkaline component, e.g., $Na_2CO_3$, but a certain portion of water and other gases may be driven off by the heating and sintering of the batch materials.

In recent years there has been an increasing demand for soluble silicates in the alkaline ratio by weight range of about 2.0 to 2.4 instead of the usual 2.9 to 3.2 ratio range. The manufacture of the more alkaline glasses has two drawbacks which have made it necessary to continue melting the 3.2 ratio in electric furnaces and causticizing the aqueous solutions to form the alkaline liquids which are sold to detergent manufacturers, among others. The first drawback is the rapid loss of $CO_2$ from the blanket of batch covering the melt as a roof and heat insulating layer. The rapid loss of $CO_2$ gas causes volcano-like eruptions through the batch cover with consequent loss of alkaline dust. Volcanolike is defined as the effect of gases rising through a fluid layer containing fine particles and pushing up the surface as a mound until the gas bursts out into the ambient air, carrying with it particles of dust. These eruptions cause changes in the ratio away from that calculated and make necessary the use of facemasks by operating personnel in the area. A major increase in clean-up costs results as well as loss of expensive alkali which is too dirty after recovery to be returned to the batch. The second drawback militating against melting more alkaline glasses is the increase in the erosion of the furnace walls. While such simple furnaces do have a useful life of several years and have comparatively low construction costs, their use is marginal in many areas and it becomes important to achieve the lowest possible costs. Deep erosion occurs in several places in the furnace walls even with the normal glass ratios in spite of efforts to maintain a layer of batch as insulation along the walls of the furnace. Thus the melting of more alkaline silicates will reduce the life of the furnace even further because the rate of chemical erosion is proportional to the alkalinity of the melt.

As I have noted previously, in the manufacture of soluble silicates, e.g., sodium and potassium silicates, by melting in an electric furnace, when the ratio of silica ($SiO_2$) to alkali oxide ($M_2O$) is less than about 2.8 or 2.9, the rate and volume of the loss of gases from the batch is so great and so rapid as to cause miniature volcanic or volcano-like eruptions through the surface of the blanket of batch which covers the molten glass and insulates the surface of the melt from the atmosphere. These eruptions cause the loss of alkaline dust and change the ratio of the furnace product from that calculated from the batch composition. This problem caused no great difficulty when the demand was largely for ratios of $SiO_2$ to $Na_2O$ greater than about 2.9, and lower ratios when needed were formed by adding caustic soda to the aqueous solution of the furnace product. In recent years the demand by the detergent industry for more alkaline glass and solutions has been increasing and it has been desirable for some years to produce such alkaline glasses in large quantities.

The ordinary raw batch for forming soluble silicate glass is made by mixing soda ash with very pure glass sands. These both contain many fine particles, but, even when dense soda ash is used, most of the very fine dust is soda ash. Sodium sulphate and carbon black are seldom used as the alkali component today but they too would encounter this problem of over-rapid gas loss. In the art of gas-fired furnaces it has long been known to aggregate these raw batches to prevent desegragation and unmixing of the sand and ash during feeding operations. In gas-fired furnaces also the dust are blown into the checker chambers and out of the stacks. Aggregation for these purposes is much more common in the manufacture of window glass, for instance, than in the manufacture of soluble silicates. In gas-fired furnaces too, it has been thought that the loss of $CO_2$ in the melt itself is useful in helping to mix the melt.

In the electric furnace operation the conditions are not similar. The batch is laid down slowly and evenly over the whole surface of the melt, forming an heat insulating blanket a foot or more thick and serving in place of a furnace roof. There are no checkers and furnace stacks. There has been little problem with unmixing or segregation. The gas has been driven off gradually and smoothly by the preheating of the batch which occurs as the batch drops slowly down to the melting zone. While it has been proposed that preheated batch be prepared for gas-fired furnaces to permit more rapid melting of the batch as it contacts the molten glass, this has not been necessary for electric furnaces because the method of operation results in melting a preheated batch since it is essentially $xSiO_2 : M_2O$ by the time it reaches the molten glass.

As I have stated, the detergent industry has been demanding more alkaline soluble silicates, 2.0 to 2.4 ratio, for some years and therefore it would have been desirable to melt the more alkaline batches in electric furnaces but because of the rapid gas loss and consequent dust problem, electric furnace plants have continued to melt a 3.2 ratio batch and alkalize the aqueous solutions sold to the detergent industry. I have now found what would on the face of it appear to be self-evident but which has apparently not occurred to those in this segment of the electric furnace industry. What I have found is that when the batch is sufficiently aggregated to bind the fines or dust together with larger particles and/or into larger particles and thus leave passage-ways for the gasses to pass upward through the blanket of batch which is used instead of a furnace roof, i.e., a porous blanket volcano-like eruptions or miniature volcanos are avoided and there is no dust problem. I prefer that the aggregated particles have a meand diameter of at least about 1/64th inches (0.0156 in. or 0.0396 cm.) but it is only necessary that the gasses filter through the blanket without building sufficient pressure to throw particles of raw batch cover into the air. In aggregating, I prefer to use about 0.1 to 1% of water or dilute alkaline salt solution as the binder (soda ash or sodium silicate for instance).

In one trial, I prepared 2 tons of a batch of 2.0 ratio using dense soda ash and fine pure glass sand. The components were thoroughly mixed and applied as usual to the upper surface of the electric furnaces forming a layer several inches thick. As the original batch cover melted down, the layer of 2.0 ratio batch approached the melt and began to sinter and loss $CO_2$. Very shortly the loss of gass was so rapid as to cause numerous eruptions over the surface above the melt and the furnace room was soon so dusty that workmen were required to don masks. The ratio of the glass produced was above 2.0. However, after a similar batch was aggregated by adding about 0.1% of 0.5 ratio sodium silicate solution and mixing with the batch in the conveyor system, the resulting batch cover settled and melted into the molten glass in the furnace without any difficulty with eruptions or dust and the final ratio was substantially 2.0. A small amount of water or other aggregating liquid could have been used but I have found that dilute soluble silicate is a preferred means of aggregating glass batches. There is an added advantage of aggregating with aqueous systems in that a slight amount of water carried into the molten glass in the furnace (e.g., 0.0001 to 0.1% water) increases the fluidity of the melt and reduces the amount of electricity needed to melt the batch and raise the fluidity to the point necessary for adequate flow through the furnace.

Further I have found what it appears should have been an obvious solution to the problem of erosion. Simply stated, the furnace construction should avoid compacting the lines of force between the electrodes. It is well known that the lines of force of the electric field between electrodes curve out in long smooth ellipsoidal arcs as well as directly across between the electrodes. The existence of these lines of force which direct the currents in the melts itself is widely and explicitly recognized in the patent art. For instance, U.S. Pat. No. 2,225,616, page 2, column 2, lines 45–47 says, "the lines of electric current extending between the electrodes are designated by the numeral 17 in the drawings." (See FIGS. 2 and 7.) U.S. Pat. No. 2,761,890 shows lines of force in FIG. 3 and says that the voltage produces a current which flows through a portion of the bath. It says in column 3, line 7, "It is known indeed that such lines of force cannot intercross but must find their places alongside each other." U.S. Pat. No. 2,659,764 shows in FIG. 1 arcuate paths of current (lines 8 to 12) between electrodes.

These lines of force have been known to students for generations and are mentioned in the standard texts for high school and college. These texts describe means to determine the existence and paths of the lines of force. As examples I mention "Physics for Colleges" by Sheldon et al, Van Nostrand Co., N.Y. 1938, and "Physics for Secondary Schools" by Stewart and Cushing, Ginn and Co. 1941.

I have noticed that it is at the points of greatest stress or compaction of the lines of force against the furnace walls that most erosion occurs. No doubt the mechanical action of the currents of melt continuously sweeps away the products of the chemical erosion, making available fresh surfaces for corrosive action and thus increases the visible rate of corrosion at these points. In order to avoid compaction of the lines of force in contact with surfaces, one merely needs to prevent lines of force which contact the furnace wall. This may be done by insulating a portion of the electrode extending into the melt. The insulation may take the form of water cooled insulation extending out far enough to avoid currents which contact the surface or forming the inner walls or confining structure of the furnace to conform to the lines of force between the electrodes. The latter procedure may be accomplished either in the initial construction or by filling in insulating material such as sand or batch between the electrodes. Conforming the walls is especially applicable to furnaces with large iron electrodes. For unknown reasons, furnace operators have not recognized this solution and have tried to increase furnace life by using larger and more chemically resistant blocks and building up thicker insulating layers of batch, which merely get washed away by the flow of melt, and finally by elongating the furnace.

The Cornelius patents, that is U.S. Pat. Nos. 1,656,510; 1,741,977; 2,098,689; 2,089090; 2,154,439, I believe are the closest prior art covering the production of soluble silicate glass in electric resistance furnaces. They show all of the essentials including numerous drawings and mention the erosion problem which I have now solved and which has been known to the art since at least 1937. They show the state of the art fully and in detail. They give formulae to guide the design of the furnace including the electrodes and suggest the use of cooling to reduce erosion. They show that erosion problems occur in both rectangular and circular furnaces. The walls do not conform to the lines of force nor do they do so even after considerable erosion has occurred.

In the drawings, 1 shows a furnace cross section elevation with a normal batch cover in which volcano-like eruptions occur. 2 demonstrates the lack of eruptions wehn the cover is aggregated. 3 shows the plan of a section of a furnace with normal iron electrodes and erosion occurring where the lines of force are compacted (4) shows the plan when the interior of the furnace conforms to the lines of force.

FIG. 1 shows the electrodes 2 extending into the melt 1 with lines of force 3 passing between the electrodes. The cover 4 consists of normal raw batch of sand and soda ash. The exhaust gases from the cover at the melt surface must force their way through the closely packed cover and where the pressure is reduced near the surface, break forth with explosive force forming volcano-like eruptions 5, carrying along with the gas particles of dust 6 which are largely fine soda ash.

Figure 1:
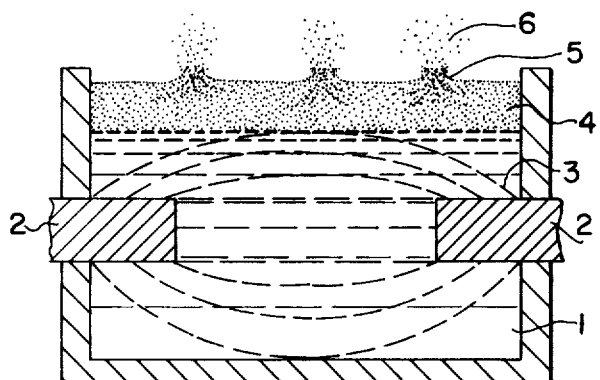
Figure 2:
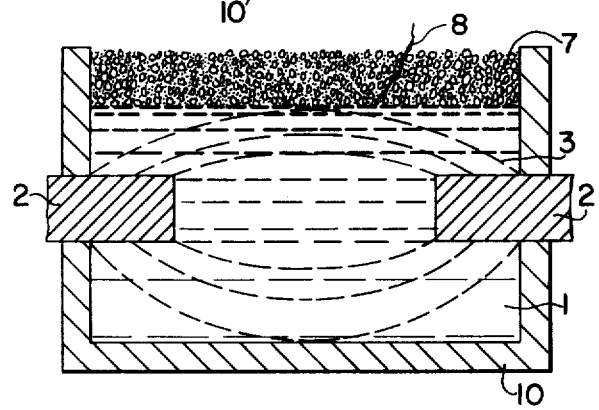
FIG. 2 shows how an aggregated cover 7 permits the gas to escape along a path 8 without building pressure and developing eruptions.
Figure 3:
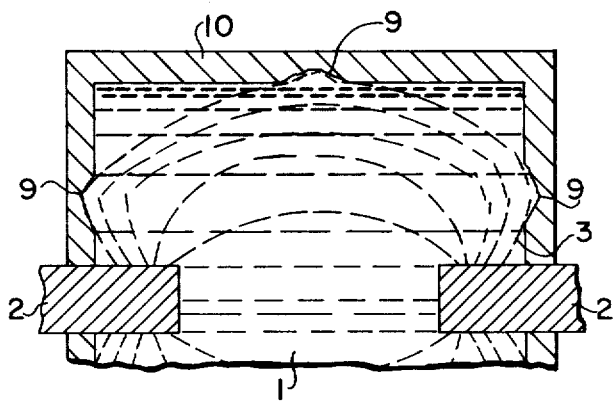
FIG. 3 shows the plan of an end of a rectangular furnace wherein the lines of force are compacted at points 9 causing erosion of the furnace wall 10.
Figure 4:
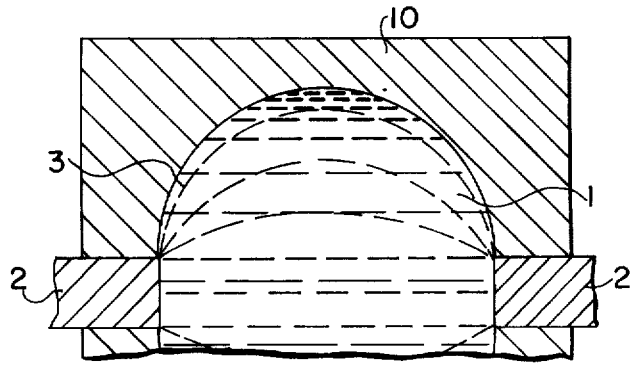

FIG. 4 the walls have been conformed to the lines of force, avoiding erosion.

Thus, in order to produce alkaline glasses, especially soluble silicates, at ratios of $SiO_2/M_2O$ less than about 2.9 to 2.8, without substantial loss of alkali and hazardous manufacturing conditions, I aggregate the raw batch with a small amount of water or alkaline salt solution. This aggregated or granulated batch is used as an insulating cover over the melt in an electric resistance furnace and prevents substantially the eruption of volcano-like openings in the surface and the loss of dust along with the emitted gases. It also serves to incorporate a small amount of water in the molten glass. The amount which remains in the melt will depend on the temperature; the lower the temperature, the more water and the relatively greater increases in the fluidity of the melt. By increasing the fluidity lower temperatures and lower ampereage are permitted. In general, I prefer to shape the walls of the furnace to conform to the lines of flow, thus preventing erosion of the furnace walls and increasing the life of the furnace and thus reducing further the cost of the operation. At the same time it reduces contamination of the glass melt and final product. Such contamination also tends to reduce fluidity.

My inventon permits the melting of more alkaline sluble silicates in electric furnaces and reduces the overall costs, thus enabling the use of electric furnaces in the areas where they are not now considered economical.

By my invention, ratios of $SiO_2:M_2O$ below about 2.9 and preferably below about 2.8 may be prepared economically and without dust hazard. It is possible to use ratios as low as 1.0 but I prefer not to go below about 1.4 because of the reactivity of the melt.

Thus, in an electric furnace for the manufacture of alkaline glasses and especially soluble silicate glasses having ratios below about 2.8 $SiO_2:M_2O$ wherein raw batch is used as in insulating cover, I have found an improvement comprising granulating and/or aggregating the raw batch with liquid taken from the group consisting of water and dilute alkaline solution. Alternatively, the invention is the improvement comprising forming the insulating cover from aggregated and/or granulated raw batch. The invention also comprises the avoidance of volcano-like eruptions on the surface by aggregating and/or granulating the raw batch. The batch may be granulated or aggregated with about 0.1% or more of the aqueous solution and the melt may contain from about 0.001 to 0.1% water as $H_2O$. My improvement may further comprise conforming the inner confining structure of the electric resistance furnace to the lines of force of the electric field between the electrodes. Thus the inner walls are made to conform substantially to the lines of flow between the electrodes.

What I claim is:

1. In a process of melting soluble silicate glass in an electric resistance furnace, said soluble silicate glass having a ratio of below about 2.8 $SiO_2/Na_2O$ wherein there is a tendency of the batch to produce escaping gas during sintering while the said batch is used as a heat insulating blanket over the melted glass, the improvement comprising forming the raw batch materials consisting essentially of silica, sodium oxide and an alkali metal alt which is decomposable by heat to a melt component and a gaseous component wherein the ratio of $SiO_2$ to $Na_2O$ is below about 2.8, with a solution taken from the group consisting of water and dilute alkaline solutions, into particles having a mean diameter of about 0.04 cm and applying the formed particles over the melt as a porous blanket in the said electric resistance furnace to permit the escaping gases to pass through said cover during the melting process whereby volcano-like eruptions are avoided.

2. In the process of claim 1, whereby the particles are formed by aggregating the raw batch materials before covering the melt.

3. In the process of claim 1, whereby the particles are formed by granulating the raw batch materials before covering the melt.

* * * * *